US011722717B1

(12) United States Patent
Huang et al.

(10) Patent No.: US 11,722,717 B1
(45) Date of Patent: Aug. 8, 2023

(54) SYSTEMS AND METHODS FOR NETWORK-BASED ADAPTIVE UPLINK DATA TRANSFER FOR LARGE VOLUME DATA

(71) Applicant: Verizon Patent and Licensing Inc., Basking Ridge, NJ (US)

(72) Inventors: Ye Huang, San Ramon, CA (US); Miguel A. Carames, Long Valley, NJ (US); Ratul K. Guha, Warwick, PA (US); Lixia Yan, Basking Ridge, NJ (US); Marc Chiaverini, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/656,144

(22) Filed: Mar. 23, 2022

(51) Int. Cl.
*H04N 21/239* (2011.01)
*H04N 21/24* (2011.01)
*H04N 21/61* (2011.01)

(52) U.S. Cl.
CPC ..... *H04N 21/2393* (2013.01); *H04N 21/2408* (2013.01); *H04N 21/6175* (2013.01); *H04N 21/6181* (2013.01)

(58) Field of Classification Search
CPC ........... H04N 21/2393; H04N 21/2408; H04N 21/6175; H04N 21/6181
See application file for complete search history.

(56) References Cited

U.S. PATENT DOCUMENTS

| 2007/0115817 | A1* | 5/2007 | Gupta | H04L 12/66 370/468 |
| 2014/0162629 | A1* | 6/2014 | Tipton | H04L 41/0816 455/423 |
| 2019/0208450 | A1* | 7/2019 | Zait | H04W 36/30 |
| 2019/0386923 | A1* | 12/2019 | Ingerman | H04L 67/12 |
| 2022/0022098 | A1* | 1/2022 | Kapadia | H04W 36/245 |

* cited by examiner

*Primary Examiner* — Jefferey F Harold
*Assistant Examiner* — Franklin S Andramuno

(57) ABSTRACT

A network device may provide, to a content server device, an upload policy for uploading data, and may receive a notification indicating that the user device is attached to a network associated with a network identifier. The network device may receive a request identifying data to be uploaded by a user device to the content server device, and may determine a time window, a data size, and the network identifier associated with the upload policy and the network. The network device may determine whether the request complies with the time window, the data size, and the network identifier, and may determine whether a quantity of tokens associated with the network identifier is zero. The network device may provide, to the user device, a response indicating approval of the data to be uploaded, and may receive an indication that uploading the data is complete.

20 Claims, 8 Drawing Sheets

US 11,722,717 B1

SYSTEMS AND METHODS FOR NETWORK-BASED ADAPTIVE UPLINK DATA TRANSFER FOR LARGE VOLUME DATA

BACKGROUND

A user of a user device (e.g., a body camera, an autonomous vehicle, a mobile phone, and/or the like) may wish to transfer large quantities of data to a content server via a cellular network, such as a fourth generation (4G) network or a fifth generation (5G) network.

DETAILED DESCRIPTION OF EXAMPLE EMBODIMENTS

Figure 1A:
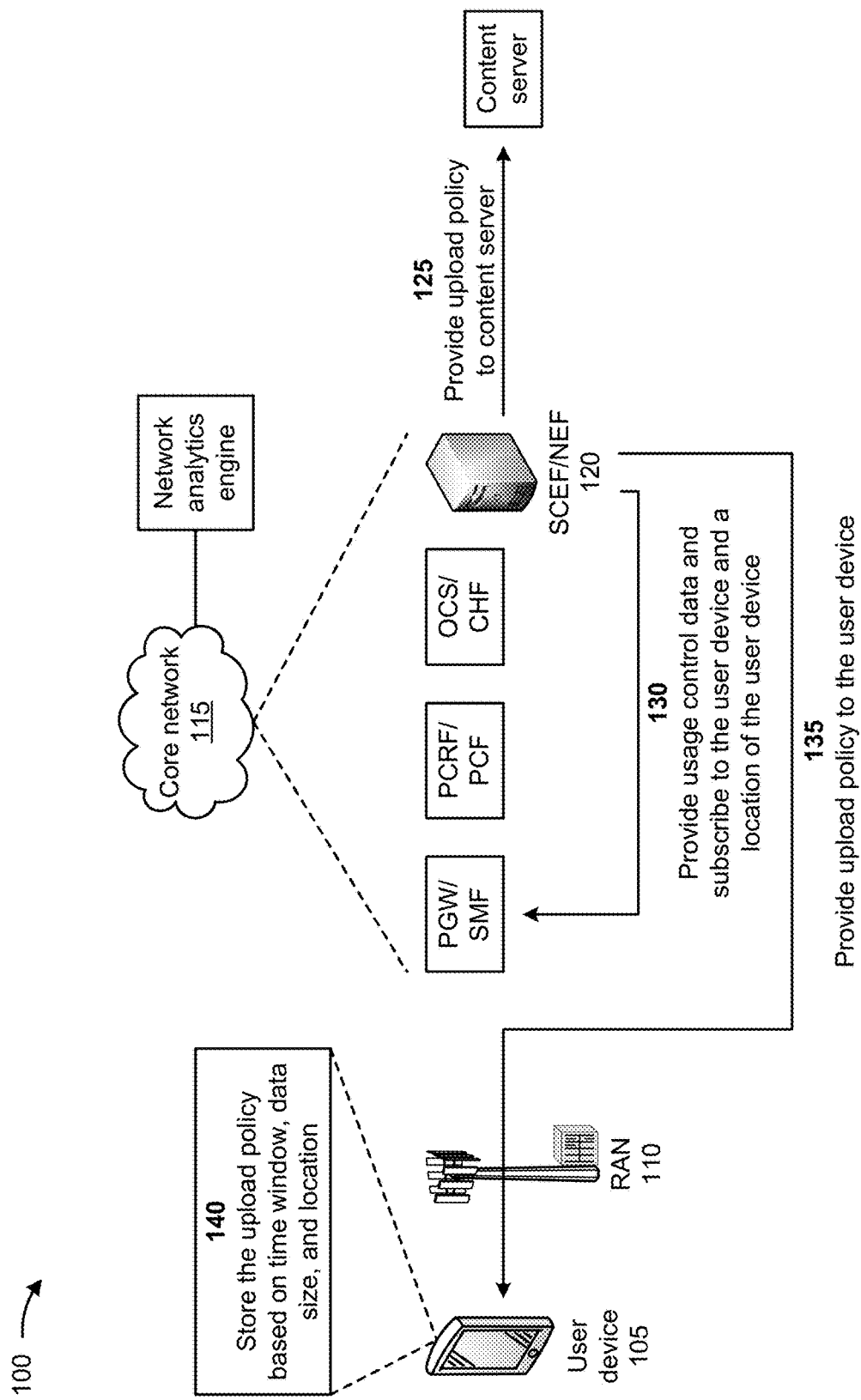
FIGS. 1A-1D are diagrams of an example associated with network-based adaptive uplink data transfer for large volume data.

The following detailed description of example implementations refers to the accompanying drawings. The same reference numbers in different drawings may identify the same or similar elements.

Some user devices (e.g., body cameras or fleet cameras) need to perform dedicated camera uploads of recorded video periodically (e.g., once a day). Such camera uploads may include gigabytes (Gb) of video data. Typically, these cameras utilize Wi-Fi when uploading the video data to a content server. However, if the Wi-Fi is unavailable, these cameras may utilize a cellular network to upload the video data to the content server. Alternatively, a customer may decide to leverage the increased performance and security of the cellular network. The users of such user devices need to transfer large quantities of video data from the user devices to the content server via a cellular network, without exceeding data upload limits and incurring additional costs (e.g., since the video data is low priority or non-urgent and the users wish to transfer the video data at off-peak hours and at a low cost). Furthermore, such uploads may cause network congestion at a radio access network (RAN) or at a transport network and may impact other customer traffic since the cellular network is not sized for such usage. Typical mechanisms for preventing such large quantities of data uploads via a cellular network may not properly account for data upload limits, the increased cost, the network congestion, and the impact to other customer traffic. Thus, current mechanisms for preventing such large quantities of data uploads via a cellular network consume computing resources (e.g., processing resources, memory resources, communication resources, and/or the like), networking resources, and/or other resources associated with preventing violation of data upload limits, increasing cost to users of user devices, handling network congestion caused by the data uploads, handling impact to other customer traffic caused by the network congestion, and/or the like.

Some implementations described herein include a network device (e.g., a service capabilities exposure function (SCEF) in 4G networks or a network exposure function (NEF) in 5G networks) that provides network-based adaptive uplink data transfer for large volume data. For example, the SCEF/NEF may provide, to a content server device, an upload policy for uploading data from a user device to the content server device, and may receive a notification indicating that the user device is attached to a network associated with a network identifier. The SCEF/NEF may receive a request indicating there is data to be uploaded by the user device to the content server device, and may validate the request. The SCEF/NEF may determine, based on validating the request, a time window, a data size, and the network identifier associated with the upload policy and the network, and may determine whether the request complies with the time window, the data size, and the network identifier associated with the upload policy and the network. The SCEF/NEF may determine whether a quantity of tokens associated with the network identifier is zero, based on determining that the request complies with the time window, the data size, and the network identifier associated with the upload policy and the network. The SCEF/NEF may provide, to the user device, a response indicating approval of the data to be uploaded, based on determining that the quantity of tokens associated with the network identifier is not zero, and may receive an indication that uploading the data is complete.

In this way, the SCEF/NEF provides network-based adaptive uplink data transfer for large volume uploads. For example, the SCEF/NEF may control transfer policy provisioning to an online charging system (OCS) or a charging function (CHF) to leverage existing real-time online usage control of user devices attempting to upload data via a cellular network. The user devices and the SCEF/NEF may utilize an uplink transfer control protocol procedure, via a non-access stratum (NAS) short message service (SMS) (e.g., out of band of the user plane), to enable control signaling between the SCEF/NEF and the user devices. The SCEF/NEF may utilize uplink transfer control logic based on time windows, a token bucket (e.g., size configurable) for grant access, and a cell load condition. This may provide an adaptive token grant scheme to enable user devices to upload data during low network load conditions and outside of pre-negotiated transfer windows. The SCEF/NEF and the OCS may utilize a dynamic transfer window to accommodate non-conforming data upload requests per preconfigured transfer policies or an automatic reattempt. Thus, the SCEF/NEF may conserve computing resources, networking resources, and/or other resources associated with preventing exceeding data upload limits, increasing cost to users of user devices, avoiding network congestion caused by the data uploads, minimizing impact to other customer traffic caused by the network congestion, and/or the like.

FIGS. 1A-1D are diagrams of an example 100 associated with network-based adaptive uplink data transfer for large volume data. As shown in FIGS. 1A-1D, example 100 includes a user device 105, a RAN 110, a core network 115, a network analytics engine (NAE), and a content server (CS). The core network 115 may include an SCEF/NEF 120 (sometimes referred to as an SCEF 120 or an NEF 120), a packet data network gateway (PGW) or a session management function (SMF), a policy and charging rules function (PCRF) or a policy control function (PCF), and an OCS or a CHF. Further details of the user device 105, the RAN 110, the core network 115, the SCEF/NEF 120, the network analytics engine, the content server, the PGW/SMF, the PCRF/PCF, and the OCS/CHF are provided elsewhere herein. Although only a single user device 105 and RAN 110 are depicted in FIG. 1A, in some implementations multiple user devices 105 and RANs 110 may be associated with the core network 115.

As shown in FIG. 1A, and by reference number 125, the SCEF/NEF 120 may provide an upload policy to the content server. For example, the SCEF/NEF 120 may create an account for the content server that includes account information, such as mobile directory numbers (MDNs) associated with user devices 105 and the upload policy. The upload policy may include information identifying time windows for the user devices 105 to upload data to the content server, sizes of data that the user devices 105 may upload to the content server during the time windows, locations of the user devices 105 (e.g., as identified by network identifiers, such as cellular identifiers of the RANs 110 supporting the user devices 105), and/or the like. The SCEF/NEF 120 may provide the account information, including the upload policy, to the content server.

As further shown in FIG. 1A, and by reference number 130, the SCEF/NEF 120 may provide usage control data to the PGW/SMF, and may subscribe to the user device 105 and a location of the user device 105. For example, the usage control data may include data identifying the user device 105 (e.g., an MDN of the user device 105), a time window for the user device 105 to upload data to the content server, a size of data that the user device 105 may upload to the content server during the time window, a dedicated access point name (APN) or a data network name (DNN) associated with the user device 105 to maintain the user device's 105 data plan usage, and/or the like. The SCEF/NEF 120 may provide the usage control data to the OCS/CHF, and the OCS/CHF may provide the usage control data to the PGW/SMF, via the PCRF/PCF. In some implementations, although not shown in the figures, the OCS/CHF may set a policy control for the user device 105 to upload data to the content server based on the usage control data, and may provide the policy control to the PGW/SMF, via the PCRF/PCF.

The SCEF/NEF 120 may generate a request to subscribe to the user device 105. The request may include a request to receive notifications about the user device 105 attaching to the RAN 110 and about a location of the user device 105. The SCEF/NEF 120 may provide the request to subscribe to the PGW/SMF so that the PGW/SMF may notify the SCEF/NEF 120 about the user device 105 attaching to the RAN 110 and about a location of the user device 105.

As further shown in FIG. 1A, and by reference number 135, the SCEF/NEF 120 may provide the upload policy to the user device. For example, the SCEF/NEF 120 may generate a short message service (SMS) message that includes the upload policy, and may provide the SMS message to the PGW/SMF. The PGW/SMF may forward the SMS message to the user device 105, and the user device 105 may store the upload policy in a data structure (e.g., a database, a table, a list, and/or the like) associated with the user device 105.

Figure 1B:
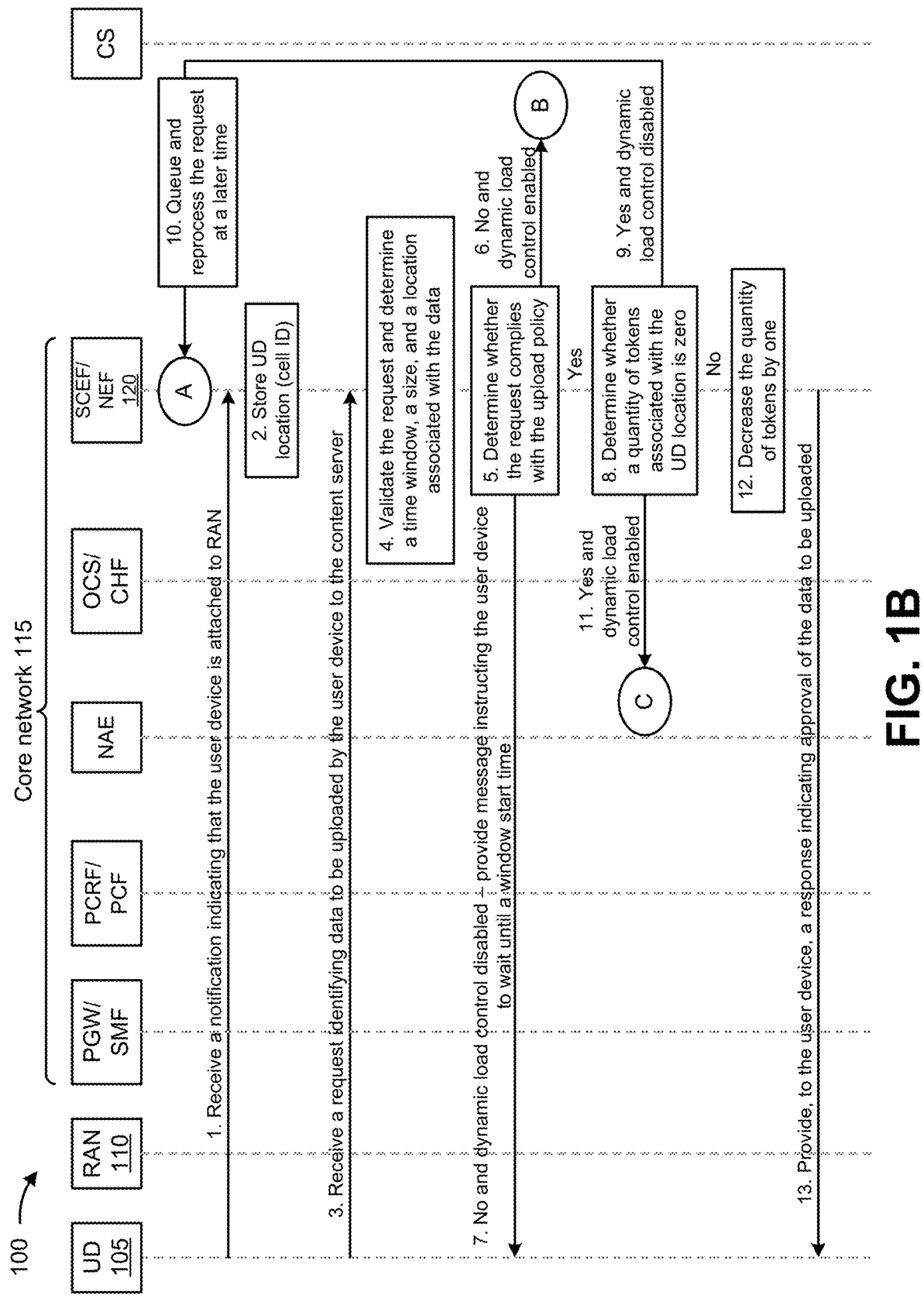
Figure 1C:
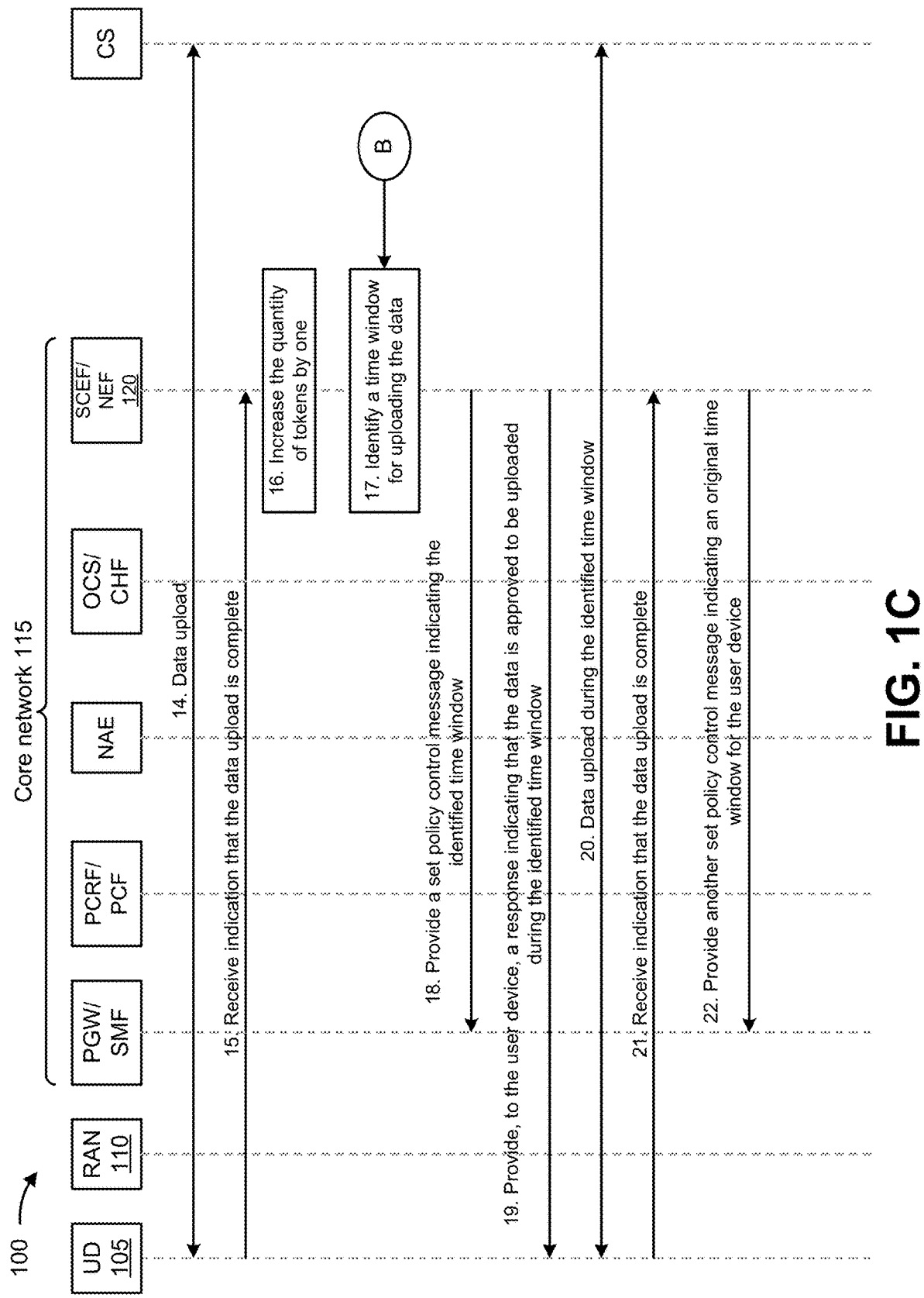
Figure 1D:
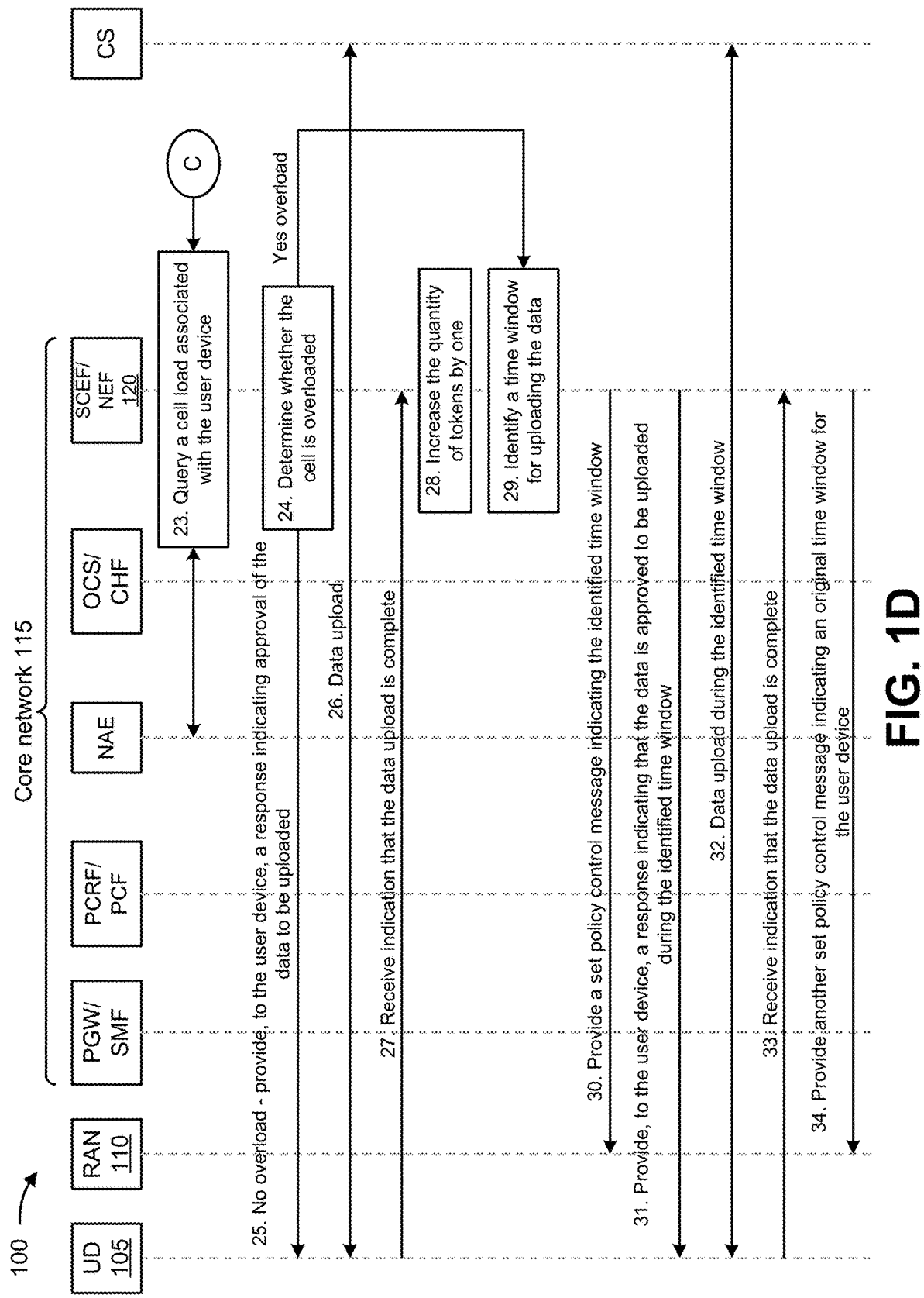

FIGS. 1B-1D are call flow diagrams associated with network-based adaptive uplink data transfer for large volume data. As shown at step 1 of FIG. 1B, the SCEF/NEF 120 may receive a notification indicating that the user device 105 attached to the RAN 110 and indicating a location (e.g., a cellular identifier) of the user device 105. The user device 105 may attach to the RAN 110 and the RAN 110 may provide the notification to the PGW/SMF. The PGW/SMF may forward the notification to the SCEF/NEF 120 and the SCEF/NEF 120 may receive the notification. As shown at step 2 of FIG. 1B, the SCEF/NEF 120 may store the location (e.g., the cellular identifier) of the user device 105 in a data structure associated with the SCEF/NEF 120. The user device 105 may generate a request identifying data (e.g., video data, autonomous vehicle data, files, machine learning data, and/or the like) to be uploaded by the user device 105 to the content server, and may provide the request to the SCEF/NEF 120. As shown at step 3 of FIG. 1B, the SCEF/NEF 120 may receive the request identifying the data to be uploaded by the user device 105 to the content server. In some implementations, the request identifying the data to be uploaded by the user device 105 to the content server may be included in an SMS message provided by the user device 105 to the PGW/SMF, and the PGW/SMF may forward the SMS message to the SCEF/NEF 120. In some implementations, the request may include an identifier of the content server, a size of the data to be uploaded to the content server, and/or the like.

As shown at step 4 of FIG. 1B, the SCEF/NEF 120 may validate the request identifying the data to be uploaded and may determine a time window, a size, and a location associated with the data. For example, the SCEF/NEF 120 may validate that the user device 105 is permitted to upload the data to the content server, the identifier of the content server, the size of the data to be uploaded, and/or the like before further processing the request identifying the data to be uploaded. If the SCEF/NEF 120 fails to validate the request, the SCEF/NEF 120 may provide, to the user device 105, a message indicating that the request is not valid. If the SCEF/NEF validates the request, the SCEF/NEF 120 may determine a time window for uploading the data to the content server, a size of the data, and a location (e.g., a cellular identifier) associated with the user device 105.

As shown at step 5 of FIG. 1B, the SCEF/NEF 120 may determine whether the request identifying the data to be uploaded complies with the upload policy. For example, the SCEF/NEF 120 may compare the time window, the size, and the location of the request with the time window, the size, and the location identified for the user device 105 in the upload policy. As shown at step 6 of FIG. 1B, if the SCEF/NEF 120 determines that the request identifying the data to be uploaded fails to comply with the upload policy, the SCEF/NEF 120 may determine whether a dynamic load control is enabled for the user device 105. The dynamic load control may include a mechanism that accommodates non-conforming requests to upload data per a preconfigured transfer policy or an auto-reattempt initiated by the SCEF/NEF 120. As further shown at step 6, if the dynamic load control is enabled for the user device 105, the SCEF/NEF 120 may perform functions associated with item B of the call flow, as described below in connection with FIG. 1C.

As shown at step 7 of FIG. 1B, if the dynamic load control is disabled for the user device 105, the SCEF/NEF 120 may provide, to the user device 105, a message instructing the user device to wait until a window start time identified by the SCEF/NEF 120. The window start time may be different than the time window provided in the request identifying the data to be uploaded. As shown at step 8 of FIG. 1B, if the SCEF/NEF 120 determines that the request identifying the data to be uploaded fails complies with the upload policy, the SCEF/NEF 120 may determine whether a quantity of tokens associated with the location of the user device 105 is zero. The quantity of tokens may be configurable by the SCEF/NEF 120 and may provide an adaptive grant scheme that allows the user device 105 to upload during low network load conditions (e.g., a configurable quantity) outside of pre-negotiated data transfer time windows. If the quantity of tokens is zero, the user device 105 may not be permitted to upload the data identified in the request.

As shown at step 9 of FIG. 1B, if the quantity of tokens associated with the location of the user device 105 is zero and the dynamic load control is disabled, the SCEF/NEF 120 may prevent the user device 105 from uploading the data identified in the request. As shown at step 10 of FIG. 1B, the SCEF/NEF 120 may queue and reprocess the request at a later time since the request was denied, and may return to item A of the call flow. As shown at step 11 of FIG. 1B, if the quantity of tokens associated with the location of the user device 105 is zero and the dynamic load control is enabled, the SCEF/NEF 120 may perform functions associated with item C of the call flow, as described below in connection with FIG. 1D.

As shown at step 12 of FIG. 1B, if the quantity of tokens associated with the location of the user device 105 is not zero, the SCEF/NEF 120 may decrease the quantity of tokens by one. Reducing the quantity of tokens by one may ensure that other user devices 105 (e.g., attempting to upload data to the content server) are handled fairly. As shown at step 13 of FIG. 1B, the SCEF/NEF 120 may provide, to the user device 105, a response indicating approval of the data to be uploaded. For example, the SCEF/NEF 120 may generate an SMS response indicating the approval of the data to be uploaded, and may provide the SMS response to the PGW/SMF. The PGW/SMF may provide the SMS response to the user device 105 so that the user device 105 may begin uploading the data to the content server.

As shown at step 14 of FIG. 1C, based on receiving the SMS response indicating approval of the data to be uploaded, the user device 105 may upload the data to the content server. As shown at step 15 of FIG. 1C, the SCEF/NEF 120 may receive an indication that the data upload is complete. For example, when the user device 105 completes uploading the data to the content server, the user device 105 may generate an SMS message indicating that the transfer of the data to the content server is complete, and may provide the SMS message to the PGW/SMF. The PGW/SMF may provide the SMS message to the SCEF/NEF 120 and the SCEF/SMF 120 may receive the SMS message indicating that the transfer of the data to the content server is complete. As shown at step 16 of FIG. 1C, the SCEF/NEF 120 may increase the quantity of tokens by one so that the user device 105 may be able to upload additional data at another time.

As shown at step 17 of FIG. 1C (e.g., which begins the functions of item B), since the dynamic load control is enabled for the user device 105, the SCEF/NEF 120 may identify a time window for uploading the data to the content server. The identified time window may be different than the time window specified by the request identifying the data to be uploaded by the user device 105 to the content server. As shown at step 18 of FIG. 1C, the SCEF/NEF 120 may provide, to the PGW/SMF, a set policy control message indicating the identified time window. For example, the SCEF/NEF may generate a set policy control message that includes an identifier of the user device 105 (e.g., the MDN of the user device 105), the identified time window (e.g., a current time), and the location of the user device 105 (e.g., the APN/DNN). The SCEF/NEF 120 may provide the set policy control message to the PGW/SMF. As shown at step 19 of FIG. 1C, the SCEF/NEF 120 may provide, to the user device 105, a response indicating that the data is approved to be uploaded during the identified time window. For example, the SCEF/NEF 120 may generate an SMS response indicating that the data is approved to be uploaded during the identified time window, and may provide the SMS response to the PGW/SMF. The PGW/SMF may forward the SMS response to the user device 105.

As shown at step 20 of FIG. 1C, based on receiving the SMS response indicating approval of the data to be uploaded, the user device 105 may upload the data to the content server during the identified time window. As shown at step 21 of FIG. 1C, the SCEF/NEF 120 may receive an indication that the data upload is complete. For example, when the user device 105 completes uploading the data to the content server during the identified time window, the user device 105 may generate an SMS message indicating that the transfer of the data to the content server is complete, and may provide the SMS message to the PGW/SMF. The PGW/SMF may provide the SMS message to the SCEF/NEF 120 and the SCEF/SMF 120 may receive the SMS message indicating that the transfer of the data to the content server is complete. As shown at step 22 of FIG. 1C, the SCEF/NEF 120 may provide, to the PGW/SMF, another set policy control message indicating an original time window for the user device 105. For example, the SCEF/NEF may generate another set policy control message that includes an identifier of the user device 105 (e.g., the MDN of the user device 105), the original time window for the user device 105, and the location of the user device 105 (e.g., the APN/DNN). The SCEF/NEF 120 may provide the other set policy control message to the PGW/SMF.

As shown at step 23 of FIG. 1D (e.g., which begins the functions of item C), since the dynamic load control is enabled for the user device 105, the SCEF/NEF 120 may query a cell load (e.g., of the RAN 110) associated with the user device 105 from the network analytics engine. For example, the SCEF/NEF 120 may request the cell load from the network analytics engine, and the network analytics engine may provide the cell load to the SCEF/NEF 120. As shown at step 24 of FIG. 1D, the SCEF/NEF 120 may determine whether the cell is overloaded based on the cell load received from the network analytics engine. For example, the SCEF/NEF 120 may compare the cell load to a load threshold to determine whether the cell is overloaded. If the cell load satisfies the load threshold, the SCEF/NEF 120 may determine that the cell is overloaded. If the cell load fails to satisfy the load threshold, the SCEF/NEF 120 may determine that the cell is not overloaded.

As shown at step 25 of FIG. 1D, if the SCEF/NEF 120 determines that the cell is not overloaded, the SCEF/NEF 120 may provide, to the user device 105, a response indicating approval of the data to be uploaded. For example, the SCEF/NEF 120 may generate an SMS response indicating the approval of the data to be uploaded, and may provide the SMS response to the PGW/SMF. The PGW/SMF may provide the SMS response to the user device 105 so that the user device 105 may begin uploading the data to the content server. As shown at step 26 of FIG. 1D, based on receiving the SMS response indicating approval of the data to be uploaded, the user device 105 may upload the data to the content server. As shown at step 27 of FIG. 1D, the SCEF/NEF 120 may receive an indication that the data upload is complete. For example, when the user device 105 completes uploading the data to the content server, the user device 105 may generate an SMS message indicating that the transfer of the data to the content server is complete, and may provide the SMS message to the PGW/SMF. The PGW/SMF may provide the SMS message to the SCEF/NEF 120 and the SCEF/SMF 120 may receive the SMS message indicating that the transfer of the data to the content server is complete. As shown at step 28 of FIG. 1D, the SCEF/NEF 120 may increase the quantity of tokens by one so that the user device 105 may be able to upload additional data at another time.

As shown at step 29 of FIG. 1D, if the SCEF/NEF 120 determines that the cell is overloaded, the SCEF/NEF 120 may identify a time window for uploading the data to the content server. The identified time window may be different than the time window specified by the request identifying the data to be uploaded by the user device 105 to the content server. As shown at step 30 of FIG. 1D, the SCEF/NEF 120 may provide, to the PGW/SMF, a set policy control message indicating the identified time window. For example, the SCEF/NEF 120 may generate a set policy control message that includes an identifier of the user device 105 (e.g., the MDN of the user device 105), the identified time window (e.g., a current time), and the location of the user device 105 (e.g., the APN/DNN). The SCEF/NEF 120 may provide the set policy control message to the PGW/SMF. As shown at step 31 of FIG. 1D, the SCEF/NEF 120 may provide, to the user device 105, a response indicating that the data is approved to be uploaded during the identified time window. For example, the SCEF/NEF 120 may generate an SMS response indicating that the data is approved to be uploaded during the identified time window, and may provide the SMS response to the PGW/SMF. The PGW/SMF may forward the SMS response to the user device 105.

As shown at step 32 of FIG. 1D, based on receiving the SMS response indicating approval of the data to be uploaded, the user device 105 may upload the data to the content server during the identified time window. As shown at step 33 of FIG. 1D, the SCEF/NEF 120 may receive an indication that the data upload is complete. For example, when the user device 105 completes uploading the data to the content server during the identified time window, the user device 105 may generate an SMS message indicating that the transfer of the data to the content server is complete, and may provide the SMS message to the PGW/SMF. The PGW/SMF may provide the SMS message to the SCEF/NEF 120 and the SCEF/SMF 120 may receive the SMS message indicating that the transfer of the data to the content server is complete. As shown at step 34 of FIG. 1D, the SCEF/NEF 120 may provide, to the PGW/SMF, another set policy control message indicating an original time window for the user device 105. For example, the SCEF/NEF 120 may generate another set policy control message that includes an identifier of the user device 105 (e.g., the MDN of the user device 105), the original time window for the user device 105, and the location of the user device 105 (e.g., the APN/DNN). The SCEF/NEF 120 may provide the other set policy control message to the PGW/SMF.

In this way, the SCEF/NEF 120 provides network-based adaptive uplink data transfer for large volume data. For example, the SCEF/NEF 120 may control transfer policy provisioning to an OCS or a CHF to leverage existing real-time online usage control of user devices 105 attempting to upload data via a cellular network. The user devices 105 and the SCEF/NEF 120 may utilize an uplink transfer control protocol procedure, via a NAS SMS, to enable control signaling between the SCEF/NEF 120 and the user devices 105. The SCEF/NEF 120 may utilize uplink transfer control logic based on time windows, a token bucket (e.g., size configurable) for grant access, and a cell load condition. This may provide an adaptive token grant scheme to enable user devices to upload data during low network load conditions and outside of pre-negotiated transfer windows. The SCEF/NEF 120 and the OCS may utilize a dynamic transfer window to accommodate non-conforming data upload requests per preconfigured transfer policies or an automatic reattempt. Thus, the SCEF/NEF 120 may conserve computing resources, networking resources, and/or other resources associated with preventing violation of data upload limits, increasing cost to users of user devices 105, handling network congestion caused by the data uploads, handling impact to other customer traffic caused by the network congestion, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
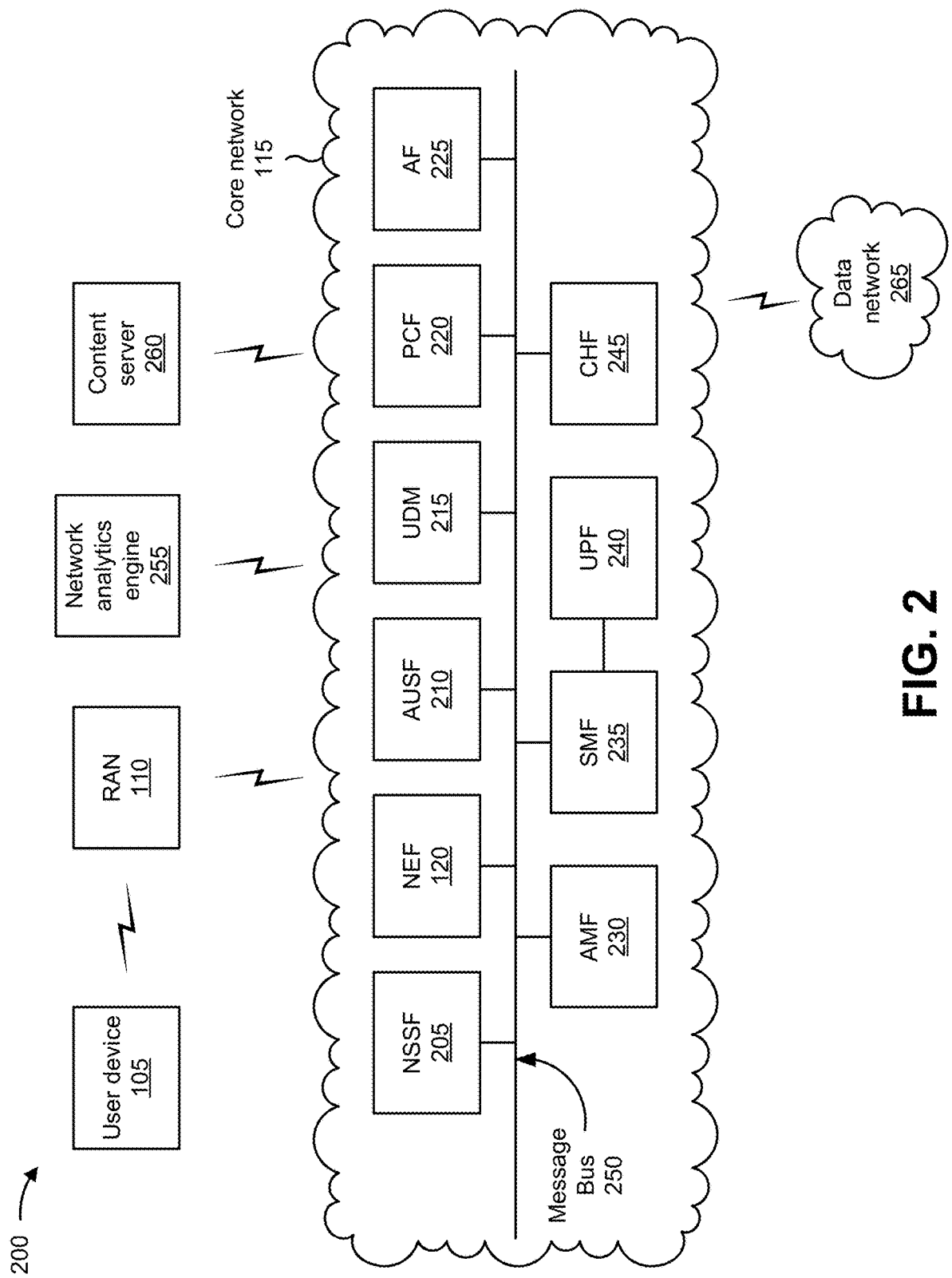
FIGS. 2 and 3 are diagrams of example environments in which systems and/or methods described herein may be implemented.

FIG. 2 is a diagram of an example environment 200 in which systems and/or methods described herein may be implemented. As shown in FIG. 2, the example environment 200 may include the user device 105, the RAN 110, the core network 115, a network analytics engine 255, a content server 260, and a data network 265. Devices and/or networks of the example environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, the NEF 120, an authentication server function (AUSF) 210, a unified data management (UDM) component 215, a PCF 220, an application function (AF) 225, an access and mobility management function (AMF) 230, an SMF 235, a user plane function (UPF) 240, and/or a CHF 245. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 105. By providing network slicing, the NSSF 205 allows an operator to deploy multiple substantially independent end-to-end networks potentially with the same infrastructure. In some implementations, each slice may be customized for different services.

The NEF 120 includes one or more devices that support exposure of capabilities and/or events in the wireless telecommunications system to help other entities in the wireless telecommunications system discover network services.

The AUSF 210 includes one or more devices that act as an authentication server and support the process of authenticating the user device 105 in the wireless telecommunications system.

The UDM 215 includes one or more devices that store user data and profiles in the wireless telecommunications system. The UDM 215 may be used for fixed access and/or mobile access in the core network 115.

The PCF 220 includes one or more devices that provide a policy framework that incorporates network slicing, roaming, packet processing, and/or mobility management, among other examples.

The AF 225 includes one or more devices that support application influence on traffic routing, access to the NEF 120, and/or policy control, among other examples.

The AMF 230 includes one or more devices that act as a termination point for non-access stratum (NAS) signaling and/or mobility management, among other examples.

The SMF 235 includes one or more devices that support the establishment, modification, and release of communication sessions in the wireless telecommunications system. For example, the SMF 235 may configure traffic steering policies at the UPF 240 and/or may enforce user equipment IP address allocation and policies, among other examples.

The UPF 240 includes one or more devices that serve as an anchor point for intraRAT and/or interRAT mobility. The UPF 240 may apply rules to packets, such as rules pertaining to packet routing, traffic reporting, and/or handling user plane QoS, among other examples.

The CHF 245 includes one or more devices that design, model, build, configure, and implement subscriber, network, and application charging and rating plans in real time. The CHF 245 may support online and offline charging feature for multiple services, including 5G and 4G core integration.

The message bus 250 represents a communication structure for communication among the functional elements. In other words, the message bus 250 may permit communication between two or more functional elements.

The network analytics engine 255 includes one or more devices capable of receiving, generating, storing, processing, providing, and/or routing information, as described elsewhere herein. The network analytics engine 255 may include a communication device and/or a computing device. For example, the network analytics engine 255 may include a server, such as an application server, a client server, a web server, a database server, a host server, a proxy server, a virtual server (e.g., executing on computing hardware), or a server in a cloud computing system. In some implementations, the network analytics engine 255 includes computing hardware used in a cloud computing environment.

The content server 260 includes one or more devices capable of receiving, generating, storing, processing, providing, and/or routing information, as described elsewhere herein. The content server 260 may include a communication device and/or a computing device. For example, the content server 260 may include a server, such as an application server, a client server, a web server, a database server, a host server, a proxy server, a virtual server (e.g., executing on computing hardware), or a server in a cloud computing system. In some implementations, the content server 260 includes computing hardware used in a cloud computing environment.

The data network 265 includes one or more wired and/or wireless data networks. For example, the data network 265 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
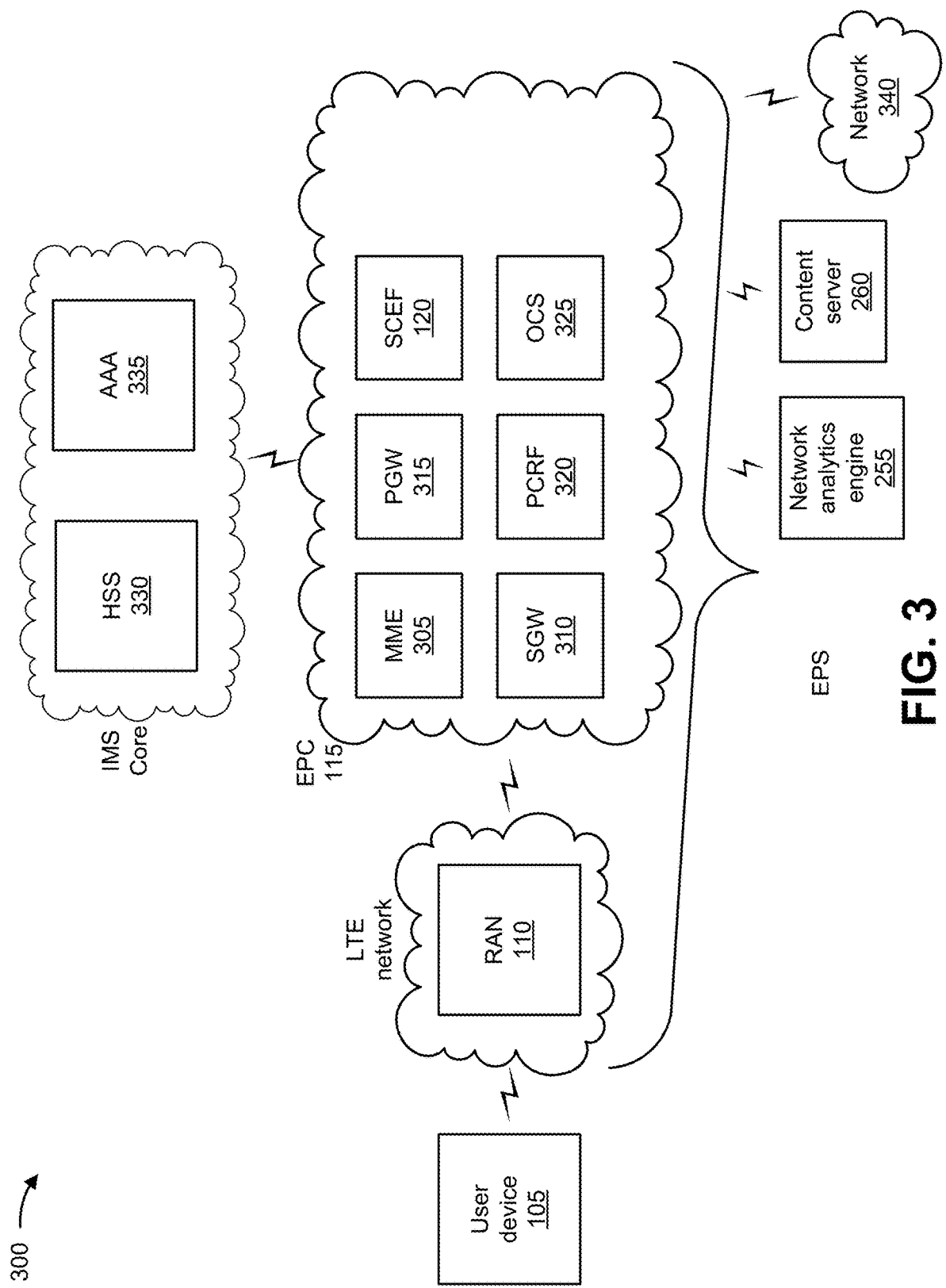

FIG. 3 is a diagram of an example environment 300 in which systems and/or methods, described herein, may be implemented. As shown in FIG. 3, the environment 300 may include the user device 105, the RAN 110, the core network 115, the network analytics engine 255, and the content server 260. The user device 105, the RAN 110, the network analytics engine 255, and the content server 260 are described elsewhere herein. The core network 115 may include an SCEF 120, a mobility management entity device (MME) 305, a serving gateway (SGW) 310, a PGW 315, a PCRF 320, an OCS 325, a home subscriber server (HSS) 330, an authentication, authorization, and accounting server (AAA) 335, and a network 340. Devices of the environment 300 may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a third generation (3G) network or a 5G network.

The environment 300 may include an evolved packet system (EPS) that includes an LTE network and/or an evolved packet core (EPC) (e.g., the core network 115) that operate based on a third-generation partnership project (3GPP) wireless communication standard. The LTE network may include a RAN that includes one or more RANs 110 that take the form of evolved Node Bs (eNBs) via which the user device 105 communicates with the EPC 115. The EPC 115 may include the SCEF 120, the MME 305, the SGW 310, the PGW 315, the PCRF 320, and/or the OCS 325 to enable the user device 105 to communicate with the network 340 and/or an Internet protocol (IP) multimedia subsystem (IMS) core. The IMS core may include the HSS 330 and/or the AAA 335, and may manage device registration and authentication, session initiation, and/or other operations associated with user devices 105. The HSS 330 and/or the AAA 335 may reside in the EPC 115 and/or the IMS core.

The SCEF 120 includes one or more devices, such as one or more server devices, capable of providing interfaces for data transfers and control messaging between enterprises and the core network 115. The SCEF 120 may provide application programming interfaces (APIs) to the enterprises for the data transfers and control messages, and may utilize 3GPP-defined interfaces with network elements in the core network 115 when performing functions.

The MME 305 includes one or more devices, such as one or more server devices, capable of managing authentication, activation, deactivation, and/or mobility functions associated with the user device 105. In some implementations, the MME 305 may perform operations relating to authentication of the user device 105. Additionally, or alternatively, the MME 305 may facilitate the selection of a particular SGW 310 and/or a particular PGW 315 to provide traffic to and/or from the user device 105. The MME 305 may perform operations associated with handing off the user device 105 from a first RAN 110 to a second RAN 110 when the user device 105 is transitioning from a first cell associated with the first RAN 110 to a second cell associated with the second RAN 110. Additionally, or alternatively, the MME 305 may select another MME (not pictured), to which the user device 105 should be handed off (e.g., when the user device 105 moves out of range of the MME 305).

The SGW 310 includes one or more devices capable of routing packets. For example, the SGW 310 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, the SGW 310 may aggregate traffic received from one or more RANs 110 associated with the LTE network, and may send the aggregated traffic to the network 340 (e.g., via the PGW 315) and/or other network devices associated with the EPC 115 and/or the IMS core. The SGW 310 may receive traffic from the network 340 and/or other network devices, and may send the received traffic to the user device 105 via the RAN 110. Additionally, or alternatively, the SGW 310 may perform operations associated with handing off the user device 105 to and/or from an LTE network.

The PGW 315 includes one or more devices capable of providing connectivity for the user device 105 to external packet data networks (e.g., other than the depicted EPC 115 and/or the LTE network). For example, the PGW 315 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, the PGW 315 may aggregate traffic received from one or more SGWs 310, and may send the aggregated traffic to the network 340. Additionally, or alternatively, the PGW 315 may receive traffic from the network 340, and may send the traffic to the user device 105 via the SGW 310 and the RAN 110. The PGW 315 may record data usage information (e.g., byte usage), and may provide the data usage information to the AAA 335.

The PCRF 320 includes one or more devices, such as one or more server devices, capable of providing policy control decision and flow-based charging control functionalities. For example, the PCRF 320 may provide network control regarding service data flow detection, gating, and/or quality of service (QoS) and flow-based charging, among other examples. In some implementations, the PCRF 320 may determine how a certain service data flow is to be treated, and may ensure that user plane traffic mapping and treatment is in accordance with a user subscription profile.

The OCS 325 includes one or more devices, such as one or more server devices, that enable a cellular network service provider to charge customers (e.g., user devices 105), in real time, based on service usage.

The HSS 330 includes one or more devices, such as one or more server devices, capable of managing (e.g., receiving, generating, storing, processing, and/or providing) information associated with the user device 105. For example, the HSS 330 may manage subscription information associated with the user device 105, such as information that identifies a subscriber profile of a user associated with the user device 105, information that identifies services and/or applications that are accessible to the user device 105, location information associated with the user device 105, a network identifier (e.g., a network address) that identifies the user device 105, information that identifies a treatment of the user device 105 (e.g., quality of service information, a quantity of minutes allowed per time period, a quantity of data consumption allowed per time period, etc.), and/or similar information. The HSS 330 may provide this information to one or more other devices of the environment 300 to support the operations performed by those devices.

The AAA 335 includes one or more devices, such as one or more server devices, that perform authentication, authorization, and/or accounting operations for communication sessions associated with the user device 105. For example, the AAA 335 may perform authentication operations for the user device 105 and/or a user of the user device 105 (e.g., using one or more credentials), may control access, by the user device 105, to a service and/or an application (e.g., based on one or more restrictions, such as time-of-day restrictions, location restrictions, single or multiple access restrictions, read/write restrictions, etc.), may track resources consumed by the user device 105 (e.g., a quantity of voice minutes consumed, a quantity of data consumed, etc.), and/or may perform similar operations.

The network 340 includes one or more wired and/or wireless networks. For example, the network 340 may include a cellular network (e.g., a 5G network, an LTE network, a 3G network, a code division multiple access (CDMA) network, etc.), a PLMN, a LAN, a WAN, a MAN, a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
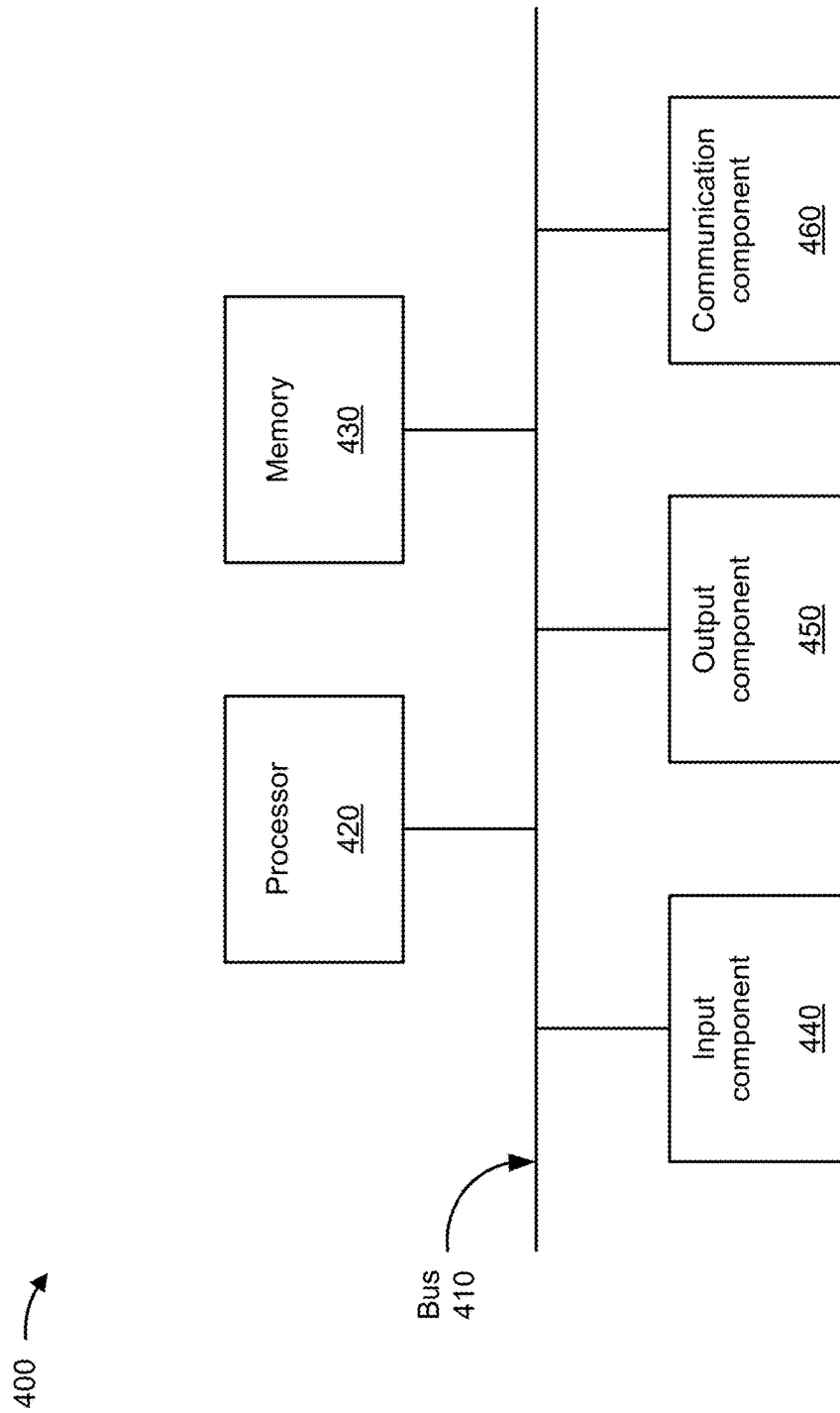
FIG. 4 is a diagram of example components of one or more devices of FIGS. 2 and 3.

FIG. 4 is a diagram of example components of a device 400, which may correspond to the user device 105, the RAN 110, the SCEF/NEF 120, the NSSF 205, the AUSF 210, the UDM 215, the PCF 220, the AF 225, the AMF 230, the SMF 235, the UPF 240, the MME 305, the SGW 310, the PGW 315, the PCRF 320, the OCS 325, the HSS 330, and/or the AAA 335. In some implementations, the user device 105, the RAN 110, the SCEF/NEF 120, the NSSF 205, the AUSF 210, the UDM 215, the PCF 220, the AF 225, the AMF 230, the SMF 235, the UPF 240, the MME 305, the SGW 310, the PGW 315, the PCRF 320, the OCS 325, the HSS 330, and/or the AAA 335 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. Memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
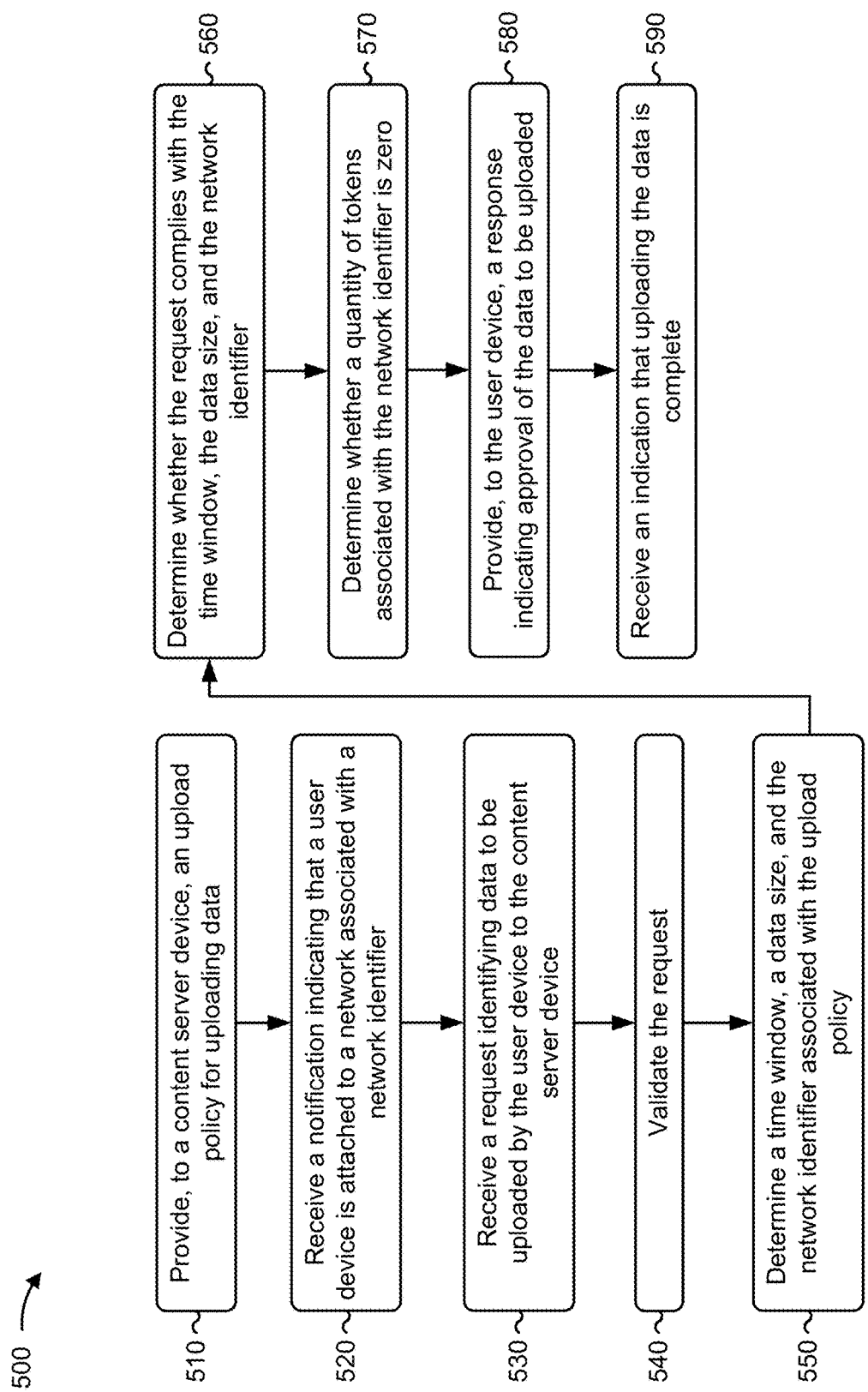
FIG. 5 is a flowchart of an example process for network-based adaptive uplink data transfer for large volume data.

FIG. 5 is a flowchart of an example process 500 for network-based adaptive uplink data transfer for large volume data. In some implementations, one or more process blocks of FIG. 5 may be performed by a network device (e.g., the SCEF/NEF 120). In some implementations, one or more process blocks of FIG. 5 may be performed by another device or a group of devices separate from or including the network device, such as a PCRF/PCF (e.g., the PCRF 320 or the PCF 220) and/or an OCS/CHF (e.g., the OCS 325 or the CHF 245). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include providing, to a content server device, an upload policy for uploading data (block 510). For example, the network device may provide, to a content server device, an upload policy for uploading data from a user device to the content server device, as described above. In some implementations, the network device is a service capabilities exposure function or a network exposure function.

As further shown in FIG. 5, process 500 may include receiving a notification indicating that a user device is attached to a network associated with a network identifier (block 520). For example, the network device may receive a notification indicating that the user device is attached to a network associated with a network identifier, as described above.

As further shown in FIG. 5, process 500 may include receiving a request identifying data to be uploaded by the user device to the content server device (block 530). For example, the network device may receive a request identifying data to be uploaded by the user device to the content server device, as described above.

As further shown in FIG. 5, process 500 may include validating the request (block 540). For example, the network device may validate the request, as described above.

As further shown in FIG. 5, process 500 may include determining a time window, a data size, and the network identifier associated with the upload policy and the network (block 550). For example, the network device may determine, based on validating the request, a time window, a data size, and the network identifier associated with the upload policy and the network, as described above.

As further shown in FIG. 5, process 500 may include determining whether the request complies with the time window, the data size, and the network identifier (block 560). For example, the network device may determine whether the request complies with the time window, the data size, and the network identifier associated with the upload policy and the network, as described above.

As further shown in FIG. 5, process 500 may include determining whether a quantity of tokens associated with the network identifier is zero (block 570). For example, the network device may determine whether a quantity of tokens associated with the network identifier is zero, based on determining that the request complies with the time window, the data size, and the network identifier associated with the upload policy and the network, as described above.

As further shown in FIG. 5, process 500 may include providing, to the user device, a response indicating approval of the data to be uploaded (block 580). For example, the network device may provide, to the user device, a response indicating approval of the data to be uploaded, based on determining that the quantity of tokens associated with the network identifier is not zero, as described above.

As further shown in FIG. 5, process 500 may include receiving an indication that uploading the data is complete (block 590). For example, the network device may receive an indication that uploading the data is complete, as described above.

In some implementations, process 500 includes providing the upload policy to the user device prior to receiving the notification. In some implementations, process 500 includes providing, to another network device, usage control data associated with the user device prior to receiving the notification, and providing, to the other network device, a request subscribing to notifications associated with the user device. In some implementations, process 500 includes decreasing the quantity of tokens by one, based on determining that the quantity of tokens associated with the network identifier is not zero.

In some implementations, process 500 includes increasing the quantity of tokens by one, based on receiving the indication that uploading the data is complete. In some implementations, process 500 includes determining that dynamic load control is disabled based on determining that the request fails to comply with the time window, the data size, or the network identifier associated with the upload policy and the network, and providing a message instructing the user device to wait until a window start time before uploading the data, based on determining that the dynamic load control is disabled.

In some implementations, process 500 includes determining that dynamic load control is enabled based on determining that the request fails to comply with the time window, the data size, or the network identifier associated with the upload policy and the network; identifying a time window for uploading the data based on determining that the dynamic load control is enabled; providing, to the user device, a response indicating that the data is approved to be uploaded during the identified time window; and receiving another indication that uploading the data is complete during the identified time window. In some implementations, process 500 includes providing, to another network device, a set policy control message indicating the identified time window, prior to providing the response indicating that the data is approved to be uploaded during the identified time window. In some implementations, process 500 includes providing, to the other network device, another set policy control message indicating an original time window for the user device, after receiving the other indication that uploading the data is complete during the identified time window.

In some implementations, process 500 includes determining that a dynamic load control is disabled based on determining that the quantity of tokens associated with the network identifier is zero, and reprocessing the request at a later time based on determining that the dynamic load control is disabled.

In some implementations, process 500 includes determining that a dynamic load control is enabled based on determining that the quantity of tokens associated with the network identifier is zero; identifying a load associated with the network based on determining that the dynamic load control is enabled; determining whether the network is overloaded based on the load associated with the network; providing, to the user device, a response indicating approval of the data to be uploaded; and receiving another indication that uploading the data is complete. In some implementations, process 500 includes increasing the quantity of tokens by one, based on receiving the other indication that uploading the data is complete.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   providing, by a network device and to a content server device, an upload policy for uploading data from a user device to the content server device;
   receiving, by the network device, a notification indicating that the user device is attached to a network associated with a network identifier;
   receiving, by the network device, a request identifying data to be uploaded by the user device to the content server device;
   validating, by the network device, the request;
   determining, by the network device and based on validating the request, a time window, a data size, and the network identifier associated with the upload policy and the network;
   determining, by the network device, whether the request complies with the time window, the data size, and the network identifier associated with the upload policy and the network;
   determining, by the network device, whether a quantity of tokens associated with the network identifier is zero, based on determining that the request complies with the time window, the data size, and the network identifier associated with the upload policy and the network;
   providing, by the network device and to the user device, a response indicating approval of the data to be uploaded, based on determining that the quantity of tokens associated with the network identifier is not zero;
   receiving, by the network device, an indication that uploading the data is complete; and
   increasing the quantity of tokens by one, based on receiving the indication that uploading the data is complete.

2. The method of claim 1, further comprising:
   providing the upload policy to the user device prior to receiving the notification.

3. The method of claim 1, further comprising:
   providing, to another network device, usage control data associated with the user device prior to receiving the notification; and
   providing, to the other network device, a request subscribing to notifications associated with the user device.

4. The method of claim 1, further comprising:
   decreasing the quantity of tokens by one, based on determining that the quantity of tokens associated with the network identifier is not zero.

5. The method of claim 1, further comprising:
   determining that dynamic load control is disabled based on determining that the request fails to comply with the time window, the data size, or the network identifier associated with the upload policy and the network; and
   providing a message instructing the user device to wait until a window start time before uploading the data, based on determining that the dynamic load control is disabled.

6. The method of claim 1, wherein the network device is a service capabilities exposure function or a network exposure function.

7. A network device, comprising:
   one or more processors configured to:
     provide, to a content server device, an upload policy for uploading data from a user device to the content server device;
     receive a notification indicating that the user device is attached to a network associated with a network identifier;
     receive a request identifying data to be uploaded by the user device to the content server device;

validate the request;
determine, based on validating the request, a time window, a data size, and the network identifier associated with the upload policy and the network;
determine whether the request complies with the time window, the data size, and the network identifier associated with the upload policy and the network;
determine whether a quantity of tokens associated with the network identifier is zero, based on determining that the request complies with the time window, the data size, and the network identifier associated with the upload policy and the network;
provide, to the user device, a response indicating approval of the data to be uploaded, based on determining that the quantity of tokens associated with the network identifier is not zero;
receive an indication that uploading the data is complete; and
increase the quantity of tokens by one, based on receiving the indication that uploading the data is complete.

8. The network device of claim 7, wherein the one or more processors are further configured to:
determine that dynamic load control is enabled based on determining that the request fails to comply with the time window, the data size, or the network identifier associated with the upload policy and the network;
identify a time window for uploading the data based on determining that the dynamic load control is enabled;
provide, to the user device, a response indicating that the data is approved to be uploaded during the identified time window; and
receive another indication that uploading the data is complete during the identified time window.

9. The network device of claim 8, wherein the one or more processors are further configured to:
provide, to another network device, a set policy control message indicating the identified time window, prior to providing the response indicating that the data is approved to be uploaded during the identified time window.

10. The network device of claim 9, wherein the one or more processors are further configured to:
provide, to the other network device, another set policy control message indicating an original time window for the user device, after receiving the other indication that uploading the data is complete during the identified time window.

11. The network device of claim 7, wherein the one or more processors are further configured to:
determine that a dynamic load control is disabled based on determining that the quantity of tokens associated with the network identifier is zero; and
reprocess the request at a later time based on determining that the dynamic load control is disabled.

12. The network device of claim 7, wherein the one or more processors are further configured to:
determine that a dynamic load control is enabled based on determining that the quantity of tokens associated with the network identifier is zero;
identify a load associated with the network based on determining that the dynamic load control is enabled;
determine whether the network is overloaded based on the load associated with the network;
provide, to the user device, a response indicating approval of the data to be uploaded; and
receive another indication that uploading the data is complete.

13. The network device of claim 12, wherein the one or more processors are further configured to:
increase the quantity of tokens by one, based on receiving the other indication that uploading the data is complete.

14. A non-transitory computer-readable medium storing a set of instructions, the set of instructions comprising:
one or more instructions that, when executed by one or more processors of a network device, cause the network device to:
provide, to a content server device, an upload policy for uploading data from a user device to the content server device;
provide the upload policy to the user device;
receive a notification indicating that the user device is attached to a network associated with a network identifier;
receive a request identifying data to be uploaded by the user device to the content server device;
validate the request;
determine, based on validating the request, a time window, a data size, and the network identifier associated with the upload policy and the network;
determine whether the request complies with the time window, the data size, and the network identifier associated with the upload policy and the network;
determine whether a quantity of tokens associated with the network identifier is zero, based on determining that the request complies with the time window, the data size, and the network identifier associated with the upload policy and the network;
provide, to the user device, a response indicating approval of the data to be uploaded, based on determining that the quantity of tokens associated with the network identifier is not zero;
receive an indication that uploading the data is complete; and
increase the quantity of tokens by one, based on receiving the indication that uploading the data is complete.

15. The non-transitory computer-readable medium of claim 14, wherein the one or more instructions further cause the network device to:
provide, to another network device, usage control data associated with the user device prior to receiving the notification; and
provide, to the other network device, a request subscribing to notifications associated with the user device.

16. The non-transitory computer-readable medium of claim 14, wherein the one or more instructions further cause the network device to:
decrease the quantity of tokens by one, based on determining that the quantity of tokens associated with the network identifier is not zero.

17. The non-transitory computer-readable medium of claim 14, wherein the one or more instructions further cause the network device to:
determine that dynamic load control is disabled based on determining that the request fails to comply with the time window, the data size, or the network identifier associated with the upload policy and the network; and
provide a message instructing the user device to wait until a window start time before uploading the data, based on determining that the dynamic load control is disabled.

18. The non-transitory computer-readable medium of claim 14, wherein the one or more instructions further cause the network device to:
- determine that dynamic load control is enabled based on determining that the request fails to comply with the time window, the data size, or the network identifier associated with the upload policy and the network;
- identify a time window for uploading the data based on determining that the dynamic load control is enabled;
- provide, to the user device, a response indicating that the data is approved to be uploaded during the identified time window; and
- receive another indication that uploading the data is complete during the identified time window.

19. The non-transitory computer-readable medium of claim 14, wherein the one or more instructions further cause the network device to:
- provide the upload policy to the user device prior to receiving the notification.

20. The non-transitory computer-readable medium of claim 14, wherein the network device is a service capabilities exposure function or a network exposure function.

* * * * *